July 13, 1965  D. E. SMITH  3,194,938
METHOD FOR PRODUCING PARTS BY ELECTRICAL EROSION
Filed Oct. 9, 1962  2 Sheets-Sheet 1

DONALD E. SMITH
INVENTOR.

BY *Lyon & Lyon*
ATTORNEYS

July 13, 1965 D. E. SMITH 3,194,938
METHOD FOR PRODUCING PARTS BY ELECTRICAL EROSION
Filed Oct. 9, 1962 2 Sheets-Sheet 2

DONALD E. SMITH
INVENTOR.

BY Lyon+Lyon
ATTORNEYS

3,194,938
METHOD FOR PRODUCING PARTS BY ELECTRICAL EROSION

Donald E. Smith, Los Angeles, Calif., assignor to L. C. Miller Company, Monterey Park, Calif., a corporation of California
Filed Oct. 9, 1962, Ser. No. 229,337
14 Claims. (Cl. 219—69)

This invention relates to improvements in the process of producing desired shapes by electrical erosion, and to improvements in apparatus for use in such process. The invention will be described principally in connection with producing helical threads by electrical erosion, but it is to be understood that this is by way of illustration, and not of limitation.

In the conventional method of forming internal threads in a hole by electrical erosion, an externally threaded tap is simultaneously rotated and axially advanced into a hole in a metal part, while an erosion current is caused to flow between the tap and the metal part. A difficulty which arises is that the threads on the leading end of the tap are eroded away at a more rapid rate than the threads which are remote from the leading end. The result is that the service life of the tap electrode is short because, after a period of use, it fails to cut a full depth of threads clear to the bottom of the hole.

The method of this invention overcomes the difficulty by axially inserting the tap electrode to the full depth of the hole before beginning the electrical erosion discharge. The tap electrode is then caused to orbit around the longitudinal axis of the tap electrode, but without rotary movement and without any axial feed. The tap electrode may be shifted laterally to produce the full desired depth of threads on the metal part by electrical erosion, and then the tap may be orbited for a single turn to complete the threads within the hole, or the tap may be orbited through a large number of cycles while increasing the radius of the orbit from time to time until the full desired depth of thread is achieved.

The same general method may be employed to form an external thread from the outer surface of a cylindrical member, using an internally threaded die electrode, instead of a tap electrode. The die electrode is caused to travel through an orbit about its longitudinal axis and without rotation or axial feed. Either one orbit at full thread depth or a number of orbits while periodically increasing the thread depth may be employed.

Although the improved method of this invention is particularly useful for cutting of internal or external threads by electrical erosion, the process is not limited to that use but may also be used to produce noncircular or polygonal or other shapes within a hole or on the outer surface of a member by electrical erosion.

Other more detailed objects and advantages will appear hereafter.

Figure 1:
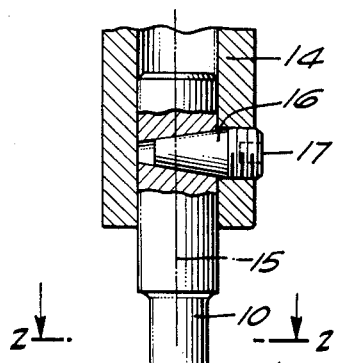
FIGURE 1 is a side elevation partly in section and showing apparatus for carrying out the improved method.
Figure 2:
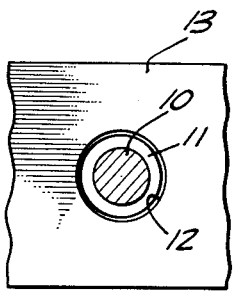
FIGURE 2 is a sectional plan view taken substantially on the lines 2—2 as shown in FIGURE 1.

Referring to the drawings, the tap electrode 10 is provided with external helical threads 11 and is received within a cylindrical hole 12 provided in a work member 13. Both the tap 10 and the work member 13 are formed of electrically conducting material. The work member 13 is usually formed of metal, and the tap 10 may be formed of metal or of a carbon-containing material, such as, for example, the electrode material manufactured by General Electric Company, Schenectady, New York, and marketed under the trademark Gentroten. The tap electrode 10 is supported in any convenient holder 14, which is capable of causing orbital movement of the tap electrode about a line parallel to its axis 15. The key 16 and set screw 17 serve to hold the tap electrode 10 in fixed position with respect to the holder 14.

Figure 3:
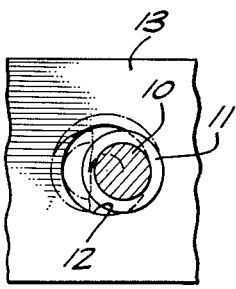
FIGURE 3 is a view similar to FIGURE 2, showing the tap electrode in the course of its orbital movement.
Figure 4:
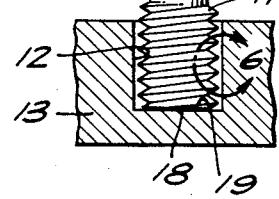
FIGURE 4 is a sectional elevation partly broken away, showing the tap electrode at the beginning of its orbital movement.
Figure 4:
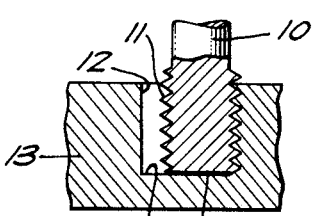
Figure 5:
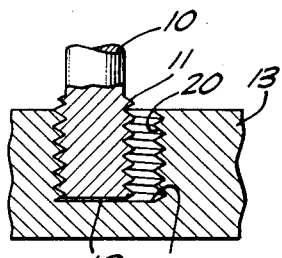
FIGURE 5 is a view similar to FIGURE 4, showing the tap electrode after it has completed one-half of an orbit at full thread depth.

In accordance with the method of this invention, the tap electrode 10 is axially inserted into the hole 12 for the full depth thereof, leaving only small clearances between the end 18 of the electrode and the bottom 19 of the hole 12, and between the crests of the threads 11 and the cylindrical wall of the hole. Conventional means, not shown, are employed to cause an erosion current to flow between thet tap electrode 10 and the work member 13. The holder 14 is moved laterally to cause the tap electrode 10 to erode metal from the work member 13 until the full depth of thread is achieved along one side of the hole 12. Further lateral movement of the tap electrode 10 is then discontinued. The parts are then in the position shown in FIGURE 3. The holder 14 is then moved in a circle, but without rotation, to cause the tap electrode 10 to move in an orbit around the center line of the hole 12, thereby producing internal threads in the hole as the orbital movement continues. When the tap electrode 10 has traveled through one complete cycle and returned to the starting point, a full circle of internal threads 20 has been produced in the work member 13 by electrical erosion.

Instead of moving the tap electrode 10 laterally for the full desired depth of the internal threads, as the first step in the process, the orbital movement of the tap electrode may be commenced with only a very small degree of eccentricity, and lateral movement of the tap electrode 10 with respect to the hole 12 may be accomplished while the orbital movement is taking place, either by continuously increasing the radius of the orbital path or by increasing such radius in step-by-step fashion. In the latter form of the method, a number of complete orbital cycles are made before a full thread depth is achieved in the work member 13.

During the orbital movement of the tap electrode 10, no relative rotation occurs between the tap electrode 10 and the work member 13, and no relative axial feed occurs.

Figure 8:
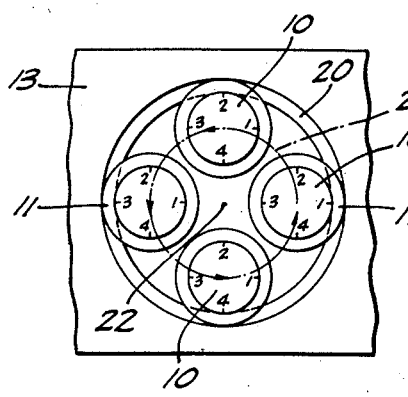
FIGURE 8 is a diagram showing how the tap electrode moves in an orbit, but without rotating with respect to the metal part into which the threads are cut.

The diagram of FIGURE 8 shows how the tap electrode 10 moves through the orbital path 21 about the center line 22 of the hole 12, without any rotation of the tap electrode. This lack of rotation is indicated by the fact that the index numbers 1, 2, 3, 4, placed at the quarter points, remain in the same relative position and do not rotate with respect to the work member 13. It will be understood from a consideration of the diagram of FIGURE 8, as well as FIGURES 1 through 5, that the process may also be carried out by holding the tap electrode 10 in stationary position and causing orbital movement of the work member 13; relative orbital movement is all that is required, and this can be accomplished by moving either or both of the members 10 and 13.

Figure 6:
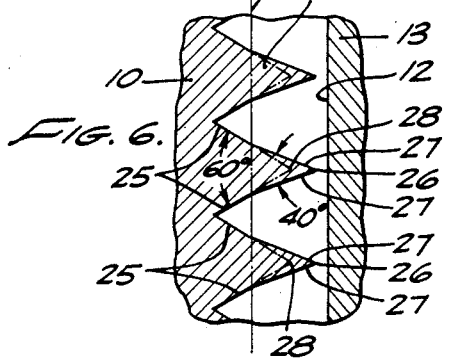
FIGURE 6 is a sectional detail encompassed by the arrow 6 in FIGURE 1 and showing a preferred thread form for the threads of the tap electrode, prior to beginning of the electrical erosion process.
Figure 7:
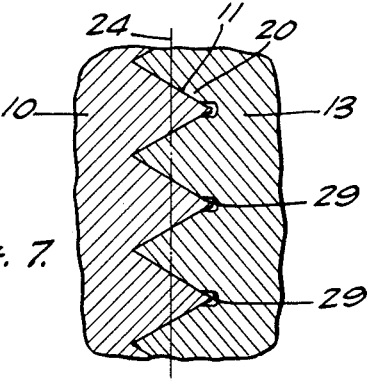
FIGURE 7 is a view similar to FIGURE 6, showing how the crests of the threads initially provided on the tap electrode wear away in the course of the electrical erosion process showing the general shape of the threads on the tap electrode and the threads produced in the metal part at the end of the process.

The invention may also be used in a two-step process, wherein the "roughing out" is done as a first step in the conventional manner, using a rotating tap electrode with an axial feed to produce threads in a hole in a metal part by electronic discharge. The "finishing" is performed as a second step, as described above, with the full depth non-rotating tap electrode having orbital movement with respect to the work member. Any suitable dielectric fluid, such as air, gas, distilled water, or kerosene, may be employed between the electrode and the work member. As shown in FIGURE 6, the threads 11 on the tap electrode 10 are of conventional 60° form below the line 24. That is, the included angle between the 25 of each thread is about 60°. However, the included angle of the crests 26 between the flank extensions 27 is substantially less than 60°, for example 40°, as shown in FIGURE 6. The crests 26 therefore project beyond the normal intersections 28 of the flanks 25, and thus they provide additional material to replace that worn away during the electrical erosion process. The crests 26 of the threads 11 wear more rapidly than the flanks 25 below the pitch line 24, and the result is that the final threads 20 produced in the work member 13 are formed of greater accuracy by reason of the extended crests 26 on the threads of the tap electrode 10. FIGURE 7 shows the general form of threads 20 produced in the work member 13 and shows how the crests of the threads 11 on the tap electrode wear away in the electrical erosion process to the final form generally shown in FIGURE 7. Clearance grooves 29 may be produced by the extended crests 26 at the roots of the threads 20 produced in the work member 13, but these grooves 29 do not interfere with the desired thread profile in the work member.

Figure 9:
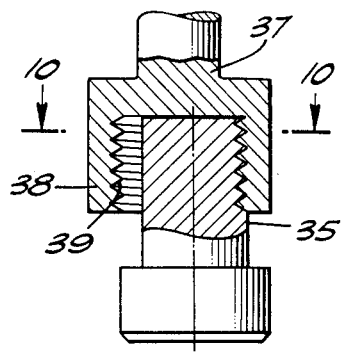
FIGURE 9 is a side elevation, partly in section, showing modified apparatus for carrying out the method, wherein a die electrode with internal threads is used to produce external threads on a part by electrical erosion.
Figure 10:
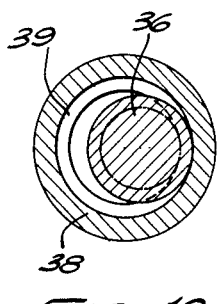
FIGURE 10 is a sectional view taken substantially on the lines 10—10 as shown in FIGURE 9.
Figure 11:
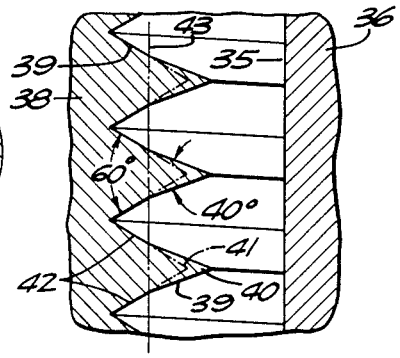
FIGURE 11 is a view similar to FIGURE 6, showing a preferred thread form for the internal threads of the die electrode.
Figure 12:
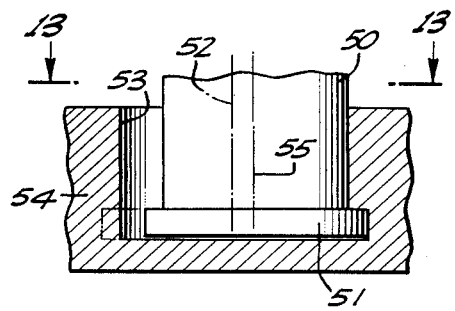
FIGURE 12 shows another form of apparatus for carrying out the method, for producing an elongated hole with an undercut in a work member.
Figure 13:
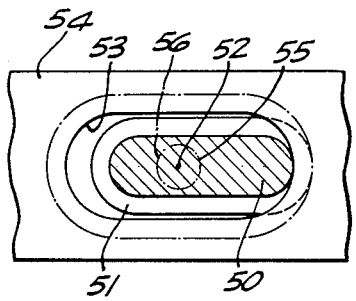
FIGURE 13 is a view taken substantially on the lines 13—13 as shown in FIGURE 12.

FIGURES 9 and 10 show how the process may be used to produce external threads on the outer surface 35 of a work member 36. The electrode 37 is provided with a portion 38 in the form of a die, having internal threads 39. FIGURE 11 shows a preferred cross-sectional profile of the internal threads 39 provided on the die electrode 37. The thread form is similar to that described above in connection with FIGURE 6, and it will be noted that the crests 40 extend beyond the intersections 41 of the flanks 42 below the pitch line 43. The method of producing external threads on the work member is carried out in the same manners as described above. The threads 39 on the electrode die 37 may be initially engaged to full depth prior to orbiting, or the depth of engagement may be increased as the orbiting movement continues. No relative rotation or axial feeding occurs between the members 36 and 37. Also, the process using the non-rotary orbiting parts without axial feed may be used following the conventional "roughing out" operation, in which a rotating internally threaded die may be fed axially along an outer surface 35 of the work member 36. The process of this invention is not limited to the formation of internal or external threads, but on the contrary may be used to produce other shapes in or on a work member, using electrical erosion. Thus, in FIGURES 12 and 13 the oblong electrode 50 with an end flange 51 may be orbited about the longitudinal axis 52 of the hole 53 formed in the work member 54, the electrode axis 55 traveling in the orbital path 56. The hole 53 is initially large enough to permit passage of the flange 51.

Figure 14:
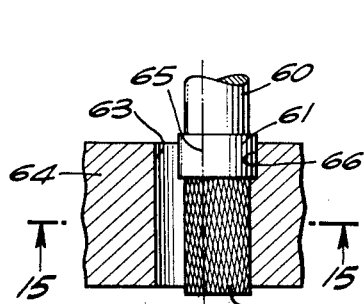
FIGURE 14 shows another form of apparatus for use in connection with the improved method.
Figure 15:
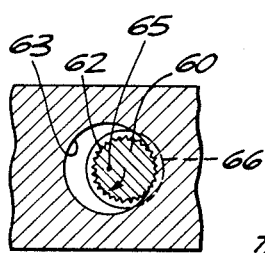
FIGURE 15 is a sectional view taken substantially on the lines 15—15 as shown in FIGURE 14.

In FIGURES 14 and 15, the electrode 60 is provided with an integral cylindrical enlargement 61 and a cylindrical portion 62, having a knurled, or serrated, outer surface. The electrode 60 is placed within the hole 63 and the work member 64 and orbited without rotation or axial feed about the axis 65 of the hole 64. This produces a counterbore 65 at one end of the hole 63 and produces a knurled or serrated surface within the remainder of the length of the hole 63.

Figure 16:
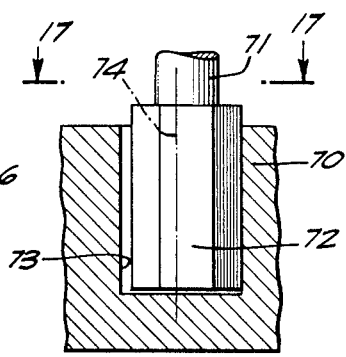
FIGURE 16 is a sectional view showing another form of apparatus for carrying out the improved method.
Figure 17:
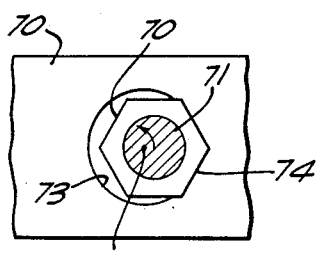
FIGURE 17 is a plan view taken substantially on the lines 17—17 as viewed in FIGURE 16.

As shown in FIGURES 16 and 17, the method may also be used to form a polygonal hole in a work member 70. The electrode 71 has a polygonal portion 72 adapted to be received within the cylindrical hole 73 and the work member 70. The electrode 71 is caused to have orbital movement about the axis 74 of the hole 73, but without rotation or axial feed. This action produces a polygonal opening 74 in the work member 70. The method of this invention as used in connection with the apparatus shown in FIGURES 12, 13, and 14, 15, and 16, 17 is the same as that described in detail above in connection with FIGURES 1–5 and FIGURES 9 and 10. Having fully described my invention, it is to be understood that I am not to be limited to the details herein set forth, but that my invention is of the full scope of the appended claims.

I claim:

1. The method of producing a desired shape in or on a work member by electrical erosion, the work member being formed of electrically conducting material, comprising the steps of: positioning a shaped electrode member with respect to the work member so that one of said members encircles a portion of the other member and with the shaped portion of the electrode member adjacent the portion of the work member to be shaped, causing relative orbital movement between the electrode member and the work member without relative rotation or axial feed, and causing an electric erosion current to flow between the electrode member and the work member.

2. The method of claim 1 wherein the electrode member is shaped on its outer surface to form the desired shape on an inner surface of the work member.

3. The method of claim 1 wherein the electrode member is shaped on an inner surface to form the desired shape on an outer surface of the work member.

4. The method of producing a desired shape in a hole in a work member by electrical erosion, the work member being formed of electrically conducting material, comprising the steps of: inserting an externally shaped tool electrode member into the hole for the full depth thereof, causing relative orbital movement between the tool electrode member and the work member without relative rotation or axial feed, and causing an electric erosion current to flow between the electrode member and the work member.

5. The method of claim 4 wherein the electrode member is threaded on its outer surface to form internal threads in the hole.

6. The method of claim 4 wherein the electrode member is elongated in a direction transverse to its axis to form an elongated hole.

7. The method of claim 4 wherein at least a portion of the outer surface of the electrode member is serrated to form an undulated surface within the hole.

8. The method of claim 4 wherein the outer surface of the electrode member is polygonal to form a rounded-apex polygonal surface within the hole.

9. The method of producing a desired shape on a portion of a work member by electrical erosion, the work member being formed of electrically conducting material, comprising the steps of: encircling said portion of the work member with an internally shaped tool electrode member, causing relative orbital movement between the tool electrode member and the work member without relative rotation or axial feed, and causing an electric erosion current to flow between the electrode member and the work member.

10. The method of producing threads in or on a work member by electrical erosion, the work member being formed of electrically conducting material, comprising the steps of: positioning a threaded tool electrode member with respect to the work member so that one of said members encircles a portion of the other member and with the threads of the tool member adjacent the portion of the work member to be threaded, causing relative orbital movement between the tool electrode member and the work member without relative rotation or axial feed, and causing an electric erosion current to flow between the electrode member and the work member.

11. The method of producing internal threads in a hole in a work member by electrical erosion, the work member being formed of electrically conducting material, comprising the steps of: inserting an externally threaded tool electrode into the hole for the full depth thereof, causing relative orbital movement between the tool electrode and the work member without relative rotation or axial feed, and causing an electric erosion current to flow between the electrode and the work member.

12. The method of producing external threads on a portion of a work member by electrical erosion, the work member being formed of electrically conducting material, comprising the steps of: encircling the work member with an internally threaded tool electrode for the full length of the portion to be threaded, causing relative orbital movement between the tool electrode and the work member without relative rotation or axial feed, and causing an electric erosion current to flow between the electrode and the work member.

13. The method of producing threads in or on a work member by electrical erosion, the work member being formed of electrically conducting material, comprising the steps of: rotating and axially advancing a threaded electrode along a surface of the work member to be threaded, causing an electric erosion current to flow between the electrode and the work member, removing the electrode after rough-forming the work member threads, axially positioning another threaded electrode adjacent the roughed-out threads, and causing relative orbital movement between the electrode and the work member without relative rotation or axial feed to finish the work member threads by electrical erosion.

14. The method of producing internal threads in a hole in a work member by electrical erosion, the work member being formed of electrically conducting material, comprising the steps of: rotating and axially advancing an externally threaded electrode into the hole, causing an electric erosion current to flow between the electrode and the work member removing the electrode after rough-forming internal threads in the hole, axially inserting another externally threaded electrode into the roughed-out internal threads, and causing relative orbital movement between the electrode and the work member without relative rotation or axial feed to finish the internal threads by electrical erosion.

References Cited by the Examiner

UNITED STATES PATENTS

| 2,650,979 | 9/53 | Teubner | 219—69 |
| 2,773,968 | 12/56 | Martellotti et al. | 219—69 |
| 2,797,299 | 6/57 | Hill | 219—69 |
| 2,813,966 | 11/57 | Matulaitis | 219—69 |
| 2,902,584 | 9/59 | Ullmann | 219—69 |

FOREIGN PATENTS 357,740 12/61 Switzerland.

RICHARD M. WOOD, *Primary Examiner.*

MAX L. LEVY, *Examiner.*